United States Patent [19]

Kumamoto

[11] Patent Number: 4,776,270
[45] Date of Patent: Oct. 11, 1988

[54] METHOD OF PRINTING CHARACTERS ON RESIN KEY TOPS

[75] Inventor: Kiyomi Kumamoto, Isezaki, Japan

[73] Assignee: Hosiden Electronics Co., Ltd., Osaka, Japan

[21] Appl. No.: 14,409

[22] Filed: Feb. 13, 1987

[30] Foreign Application Priority Data

Apr. 25, 1986 [JP] Japan .................. 61-96228

[51] Int. Cl.$^4$ .............................................. B41L 23/20
[52] U.S. Cl. ...................................... 101/35; 101/129; 101/416 A; 106/32
[58] Field of Search ............... 101/129, 211, 450.1, 101/416 A, 35, 38 A, 40, 44; 106/32, 30; 427/258, 286, 288; 428/509; 434/346

[56] References Cited

U.S. PATENT DOCUMENTS

| Re. 23,753 | 12/1951 | Bjorksten | 428/509 |
|---|---|---|---|
| 2,160,725 | 5/1939 | Flint | 101/39 |
| 2,406,878 | 9/1946 | Whyzmuzis | 106/30 |
| 2,860,069 | 11/1958 | Petrecca | 423/286 |
| 3,055,117 | 9/1962 | Bernstein | 434/346 |
| 3,091,546 | 5/1963 | Schmall | 427/258 |
| 3,510,340 | 5/1970 | Blake | 427/288 |
| 3,894,237 | 7/1975 | Choate | 101/40 |
| 3,934,500 | 1/1976 | Jackson | 101/38 A |
| 3,986,823 | 10/1976 | Mayer | 8/471 |
| 4,072,099 | 2/1978 | Martin | 101/44 |
| 4,186,115 | 1/1980 | Spatz | 106/32 |

FOREIGN PATENT DOCUMENTS

| 135132 | 4/1947 | Australia . | |
|---|---|---|---|
| 873820 | 6/1971 | Canada . | |
| 2251319 | 5/1974 | Fed. Rep. of Germany | 106/32 |
| 2435251 | 2/1976 | Fed. Rep. of Germany | 101/177 |
| 58535 | 5/1978 | Japan | 106/32 |
| 119006 | 9/1979 | Japan | 101/211 |
| 38814 | 3/1980 | Japan | 106/32 |
| 24467 | 3/1981 | Japan | 106/32 |
| 14664 | 1/1982 | Japan | 101/450.1 |
| 178787 | 11/1982 | Japan | 101/211 |
| 1211149 | 11/1970 | United Kingdom . | |
| 1221126 | 2/1971 | United Kingdom . | |

*Primary Examiner*—Clyde I. Coughenour
*Attorney, Agent, or Firm*—Pollock, Vande Sande and Priddy

[57] ABSTRACT

A method of printing characters on key tops made of a resin comprises the steps of printing character patterns on the key tops using an ink obtained by adding a coloring agent to a multifunctional acrylic ultraviolet-ray-curable paint and subsequently hardening the printed ink character patterns by irradiating the printed surface of each key top with ultraviolet rays.

4 Claims, 2 Drawing Sheets

PRIOR ART
FIG. 1A         FIG. 1B
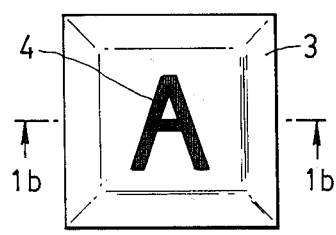 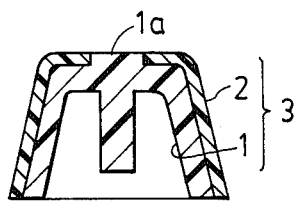
PRIOR ART
FIG. 2A         FIG. 2B
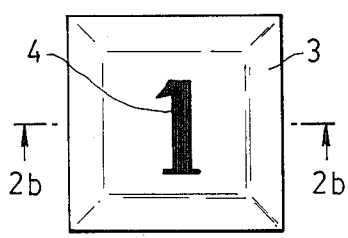 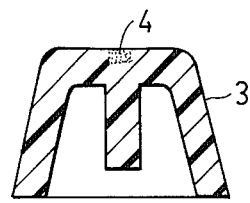

METHOD OF PRINTING CHARACTERS ON RESIN KEY TOPS

BACKGROUND OF THE INVENTION

This invention relates to a method of printing characters on the surface of resin members, i.e., key tops used for various keyboards and cases.

On the key tops used for a keyboard, characters, symbols, drawings, etc. representing the functions of the key are often written. The characters, symbols, drawings, etc. (hereinafter generically referred to as "characters") on key tops are very frequently touched by the hand, so that they are required to have high durability. That is, the character on each key top should not be erased regardless of the frequency of touching the key top.

Usually, the following three different methods have been used heretofore to form characters on key tops.

(1) Two-color molding method: As shown in FIGS. 1A and 1B, a key top 3 consisting of a base member 1 and a cover member 2 is molded by a double molding process using resin materials having different colors for the members 1 and 2 such that the base member 1 has an integral top projection 1a having a plan shape of a character in flush with the cover member 2 defining the background of the character. The top projection 1a of the base member 1, which consists of ABS resin, for instance, has the shape of a predetermined character on top of the key top 3.

(2) Sublimation ink printing method: As shown in FIGS. 2A and 2B, a key top 3 is molded using PBT resin, for instance. Then, the top of the key top 3 is printed with a predetermined character using a sublimation ink. The printing is effected by thermal permeation of the ink (to a depth of approximately 40 $\mu$m) into the resin. After the printing, the key top is subjected to a thermal treatment (at approximately 170° C. for 6 minutes) and a cleansing step, thereby obtaining a character pattern 4.

(3) Clear hard coat method: As shown in FIGS. 3A and 3B, a key top 3 is molded using ABS resin, for instance. Then a character is printed on the top of the key top 3 by about twofold overlap printing using a quick-drying ink. After the printing, the entire outer surface of the key top 3 is covered with a layer 5 of a multifunctional acrylic ultraviolet-ray-curable paint. The layer 5 is then subjected to polymerization hardening by irradiation of ultraviolet rays.

With any of the above prior art methods, satisfactory results can be obtained so far as the life of the character pattern is concerned, with the initial shape of the character being maintained after ten million times of striking of the key.

However, short production time, large-variety small-lot and low price tendency can not all be satisfied simultaneously.

(1) Drawbacks of the two-color molding method: With this method, the material cost is low because the inexpensive ABS resin is used. Also, the price of the product is comparatively low because the key top can be formed by the simple double molding.

However, since the base member 1 and cover member 2 are prepared separately, many molds are necessary, and the cost for the molds is increased. Further, the preparation of molds requires a long time, thus dictating a long period from the key top purchase order acceptance until the delivery of the product. Further, in the case of large-variety small-lot products, the cost is increased because of the cost of the molds. Furthermore, since the shape of the character itself is molded using a resin, the preparation of molds for complicated characters such as Chinese characters is difficult.

(2) Drawbacks of the sublimation ink printing method: The price of the product is comparatively high because a long thermal treatment time is necessary, and also because a step of wiping out residual ink on the key top surface is necessary. In addition, the color of the character has to be considerably thicker or darker than the color of the resin material constituting the key top 3. For example, a white character can not be printed on a black surface. Further, the PBT resin and ink material are comparatively expensive.

(3) Drawbacks of the clear hard coat method: The printing with the quick-drying ink has to be carried out through two-fold or three-fold printing, so that it is time-consuming. In addition, imperfect printing is liable to occur, and the yield is inferior. Further, an expensive clear hard coating (i.e., multifunctional acrylic ultraviolet-ray-curable paint) is coated over the entire outer surface of the key top 3. The coating operation is rather time-consuming. Further, because the clear hard coating is used, dust particles on the key top surface and in the coating are conspicuous, thus reducing the yield. Therefore, this method leads to the highest product price among the three methods noted above.

SUMMARY OF THE INVENTION

A primary object of the invention is to provide a novel method of printing on a resin member, which is an improvement over the prior art clear hard coat method.

Another object of the invention is to provide a method of printing on a resin member, which can satisfy all of the advantages of short production time, large-variety small-lot products and low price.

The printing method according to the invention comprises a step of printing a character on a surface of a resin member using an ink obtained by adding a coloring agent to a multifunctional acrylic ultraviolet-ray-curable paint and a step of irradiating the resultant printing surface with ultraviolet rays so that the printed ink is hardened, thereby obtaining a color pattern of the character on the surface of the resin member.

The resin constituting the printing surface may be a non-crystalline resin, e.g., ABS resin, AS resin and polycarbonate resin, or a crystalline resin, e.g., PBT resin and POM resin. The former type of resin, however, is preferred from the standpoint of the superior affinity to the multifunctional acrylic ultraviolet-ray-curable paint. It is also known that these resins provide as high hardness as 3 to 4 H (corresponding to the hardness of a pencil core) after the hardening. Therefore, the ink which is obtained by adding a coloring agent to the multifunctional acrylic ultraviolet-ray-curable paint has similar characteristics. According to the invention, a character is printed on the surface of a resin member using an ink obtained by adding a coloring agent to a multifunctional ultraviolet-ray-curable paint, and the ink after the printing is cured, i.e., hardened by irradiating it with ultraviolet rays. Therefore, the printed character portion has satisfactory affinity to the surface of resin member carrying the character, and also this portion has sufficient hardness.

Further, with the method of printing according to the invention the multifunctional acrylic ultraviolet-ray-curable paint is used only for the portion of the character pattern, so that it is possible to extremely reduce the amount of use of the expensive multifunctional acrylic ultraviolet-ray-curable paint.

Furthermore, there is no need of performing any over-coating step after the printing of the character or the like. Also, unlike the case of using a quick-drying ink there is no need of performing the printing by a two-fold or three-fold printing. It is thus possible to reduce steps involved.

Moreover, according to the invention the hardening is achieved not by high temperature but by irradiation with ultraviolet rays. This means that it is possible to print characters on key tops that have been assembled in a keyboard.

As has been described in the foregoing, it is possible to reduce the amount of paint used and reduce the steps involved to only two steps, i.e., printing and hardening steps, so that the printing cost can be reduced. Further, since the multifunctional acrylic ultraviolet-ray-curable paint provides high hardness when cured, the character portion has high durability and will maintain the initial shape even after long use.

The ink may be printed on the printing surface by pad printing, silk screen printing, relief printing, intaglio printing, etc. In the case of a curved printing surface, the pad printing technique is suitable.

To obtain an ink composed of a multifunctional acrylic ultraviolet-ray-curable paint and a coloring agent, either (a) the coloring agent, e.g., a pigment or a dye, may be directly added to the multifunctional acrylic ultraviolet-ray-curable paint, or (b) a commercially available ultraviolet-ray-curable ink (composed of a pigment, a base resin, a reactive diluting agent, a photoreaction starter, a photosensitizer and other additives) and the multifunctional acrylic ultraviolet-ray-curable paint are mixed together.

The multifunctional acrylic ultravilot-ray-curable paint is prepared by adding, to a multifunctional acrylic resin as base resin, a reactive diluting agent, a photoreaction starter, a photosensitizer and other additives.

The thickness of ink printed on the printing surface is above 5 μm, preferably 10 to 20 μm. If the thickness is insufficient, the life of the printed pattern is reduced. If the thickness is excessive, e.g., above 35 μm, cracks will be produced in the ink during the hardening process.

Optionally, a preheating step may be provided before the hardening step. The ultraviolet rays for the hardening step may be provided using a high pressure mercury lamp or a metal halide lamp. The latter is preferred from the standpoint of a higher ultraviolet ray generation efficiency. The ultraviolet ray irradiation is suitably effected with an intensity of 80 W/cm and for a couple of seconds.

BRIEF DESCRIPTION OF THE DRAWINGS

FIG. 1A is a plan view showing a key top with a character portion obtained by a prior art two-color molding method;

FIG. 1B is a sectional view taken along line 1b—1b in FIG. 1A;

FIG. 2A is a plan view showing a key top with a character obtained by a prior art sublimation ink printing method;

FIG. 2B is a sectional view taken along line 2b—2b in FIG. 2A;

EXAMPLES OF THE INVENTION

EXAMPLE 1

An ink was prepared by adding a coloring agent (pigment or dye) to the multifunctional acrylic ultraviolet-ray-curable paint.

Figure 3A:
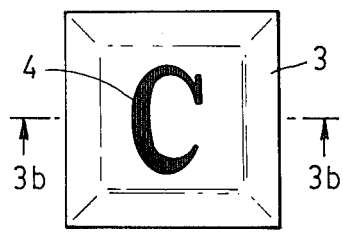
FIG. 3A is a plan view showing a key top with a character obtained by a prior art clear hard coat method.
Figure 3B:
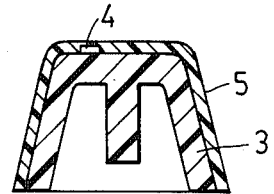
FIG. 3B is a sectional view taken along line 3b—3b in FIG. 3A.
Figure 4A:
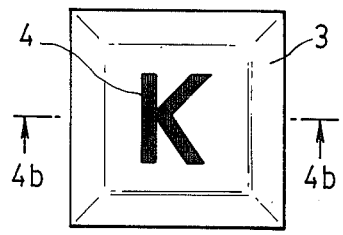
FIG. 4A is a plan view showing a key top with a character obtained by a method according to the invention.
Figure 4B:
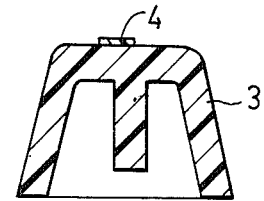
FIG. 4B is a sectional view taken along line 4b—4b in FIG. 4A.

Using this ink, a character 4, as shown in FIGS. 4A and 4B, was printed on the top surface of a key top 3 consisting of ABS resin or PBT resin. The printing thickness was set to approximately 10 μm. After the printing, the key top 3 was subjected to a preheating process in air held at about 80° C. while the key top was being carried on a conveyer travelling at 5 m/min through a tunnel of 3 meters long. Near the exit of the tunnel was provided therein a UV-lamp, constituting an irradiation room of about 30 cm long, where the key top 3 was irradiated with ultraviolet rays (with an intensity of 80 W/cm) for a couple of seconds to harden the ink printed in the pattern of a character.

The character portion thus obtained by printing and hardening was excellent in respect to its tight adherence to the key top surface, anti-separation and wear-proof property. It was found that the preheating process had an effect such that the face of the hardened character portion was superior in smoothness to that obtained without preheating; however, upon request, the preheating process can be dispensed with. It was also confirmed that a ten million striking test could be sufficiently withstood.

EXAMPLE 2

A blend ink was prepared by mixing a multifunctional acrylic ultraviolet-ray-curable paint and an ultraviolet-ray-curable ink in a weight ratio of 50% to 50%.

Using this ink, a character was printed on the printing surface consisting of ABS resin or PBT resin in the manner as described in Example 1. The printing thickness was set to approximately 10 μm. After the printing, the ink was hardened by irradiating it with ultraviolet rays (with an intensity of 80 W/cm) for a couple of seconds.

It was confirmed that the print portion of the character or the like obtained in this example sufficiently withstood a ten million times striking test so that it was capable of practical use.

It was further confirmed that when the ratio between the multifunctional acrylic ultraviolet-ray-curable paint and ultraviolet-ray-curable ink was set to either 2:8 or 8:2, the obtained print portions of characters were inferior in respect to the anti-separation property and therefore unsatisfactory. The mixing ratio suitably ranged from 4:6 to 6:4 and was preferably 1:1.

As has been described in the foregoing, according to the invention the expensive clear hard coat may be used only for the character portion. In addition, since it is mixed with the ink, the amount of the expensive paint used can be reduced. Further, the printing operation consists of two steps, i.e., printing and hardening steps, so that it is possible to reduce the cost of manufacture. For example, the cost can be reduced to be lower by about 25% than in the case of the prior art method (1), by about 40% than in the case of the prior art method (2) and by 50% or above than in the case of the prior art method (3).

Further, it is possible to provide a key top with a character which has high durability and can not be erased for a long time.

Further, for printing a different character, only the printing plate needs to be changed. The preparation of the printing plate is more inexpensive than the preparation of a mold for the resin molding, and also the plate can be prepared in a shorter period of time. Thus, it is possible to provide a key top, which can satisfy all of the requirements of short production time, mass production, large-variety small-lot production and low price.

Further, where an ultraviolet-ray-curable ink is used, the hardening is obtained only by irradiation of ultraviolet rays. Therefore, the handling of the printed parts need not be in a hurry compared to the case of using a quick-drying ink as in the prior art method (3).

What is claimed is:

1. A method of printing characters on key tops made of a resin, comprising the steps of:

printing, by a silk screen printing or pad printing process, characters on the upper surfaces of the key tops using an ink which comprises a coloring agent added to a multifunctional acrylic ultraviolet-ray-curable paint, to form a printed ink layer in the shape of a character on each of said surfaces, each of said printed ink layers having a thickness in a range from 5 to 20 $\mu$m;

preheating the printed surfaces of the key tops; and thereafter irradiating the preheated printed surfaces of the key tops with ultraviolet rays to harden the printed ink layers, thereby obtaining durable patterns of the characters on said key tops.

2. The method according to claim 1 wherein said resin is a noncrystalline resin.

3. The method according to claim 1 wherein the thickness of each of said printed ink layers is approximately 10 $\mu$m.

4. The method according to claim 1 wherein said ultraviolet ray irradiation is effected at an intensity of approximately 80 W/cm for a few seconds.

* * * * *